Dec. 9, 1924.

L. C. FREEMAN

INSTRUMENT BOARD FOR MOTOR VEHICLES

Filed Oct. 2, 1922     2 Sheets-Sheet 1

1,518,139

Inventor
LOWELL C. FREEMAN

By Jung Harness
Attorney

Dec. 9, 1924.

L. C. FREEMAN

INSTRUMENT BOARD FOR MOTOR VEHICLES

Filed Oct. 2, 1922

Inventor

LOWELL C. FREEMAN

By J. King Harness

Attorney

Patented Dec. 9, 1924.

1,518,139

UNITED STATES PATENT OFFICE.

LOWELL C. FREEMAN, OF DETROIT, MICHIGAN.

INSTRUMENT BOARD FOR MOTOR VEHICLES.

Application filed October 2, 1922. Serial No. 591,961.

*To all whom it may concern:*

Be it known that I, LOWELL C. FREEMAN, a citizen of the United States, residing at Detroit, in the county of Wayne and State of Michigan, have invented certain new and useful Improvements in Instrument Boards for Motor Vehicles, of which the following is a specification, reference being had to the accompanying drawings.

My invention relates to instrument boards for motor vehicles wherein a plate of desired configuration may be superimposed over an instrument board of more or less standard construction in order to advantageously group the various instruments usually found on the instrument board of an automobile and to lend beauty to their assembly.

It is a further object of my invention to provide such a plate which may be suitably etched in order to lend beauty to the instrument board assembly.

It is a further object of my invention to provide such a device of economical and simple construction and to provide means for assembling the same to the instrument board proper at the least expense and in a manner to lend the greatest beauty thereto.

With these and other objects in view, my invention consists in the arrangement, combination and construction of the various parts of my improved device as described in the specification, claimed in my claims and shown in the accompanying drawings, in which:

Figures 1, 2:
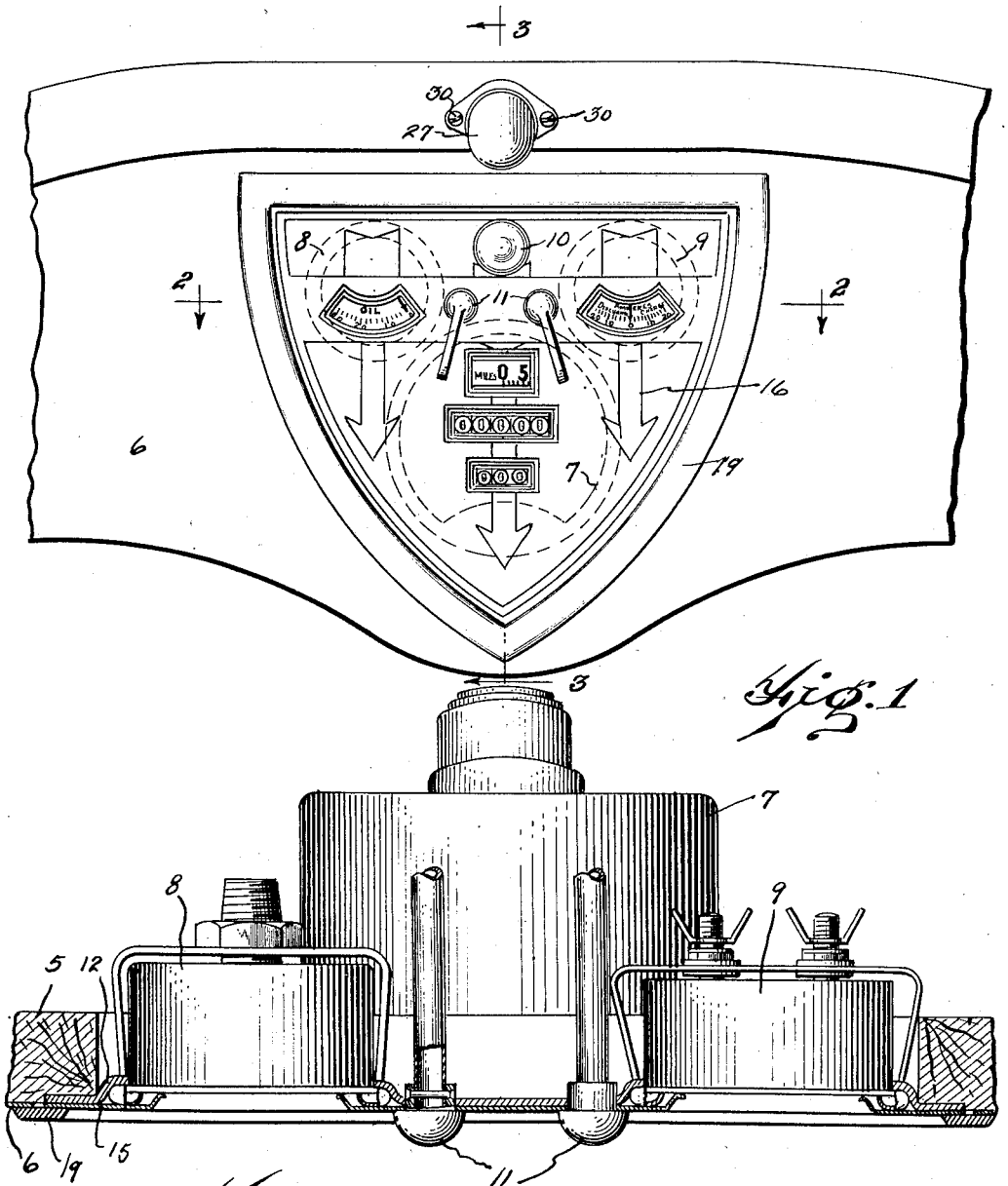
Fig. 1 is a front elevation of an instrument board of an automobile with my improved devices located thereon.
Fig. 2 is a sectional view taken on line 2—2 of Fig. 1.

I have shown a conventional type of instrument board 5, having the conventional metal covering 6 thereon. I have also shown a set of conventional instruments such as a speedometer 7, an oil gage 8, ammeter 9, choke handle 10 and ignition and light switch handles 11, all suitably and conventionally mounted upon the plate 12 which is secured to the instrument board 5 by means of counter-sunk bolts 13 and a nut 14 screwed on the end thereof.

The metal instrument board cover 6 is cut away in any suitable configuration to accommodate an etched plate 15. The form of plate here shown is the shield or trade mark of a well known type of automobile having certain portions of the trade mark such as 16 etched on the face thereof.

Figure 3:
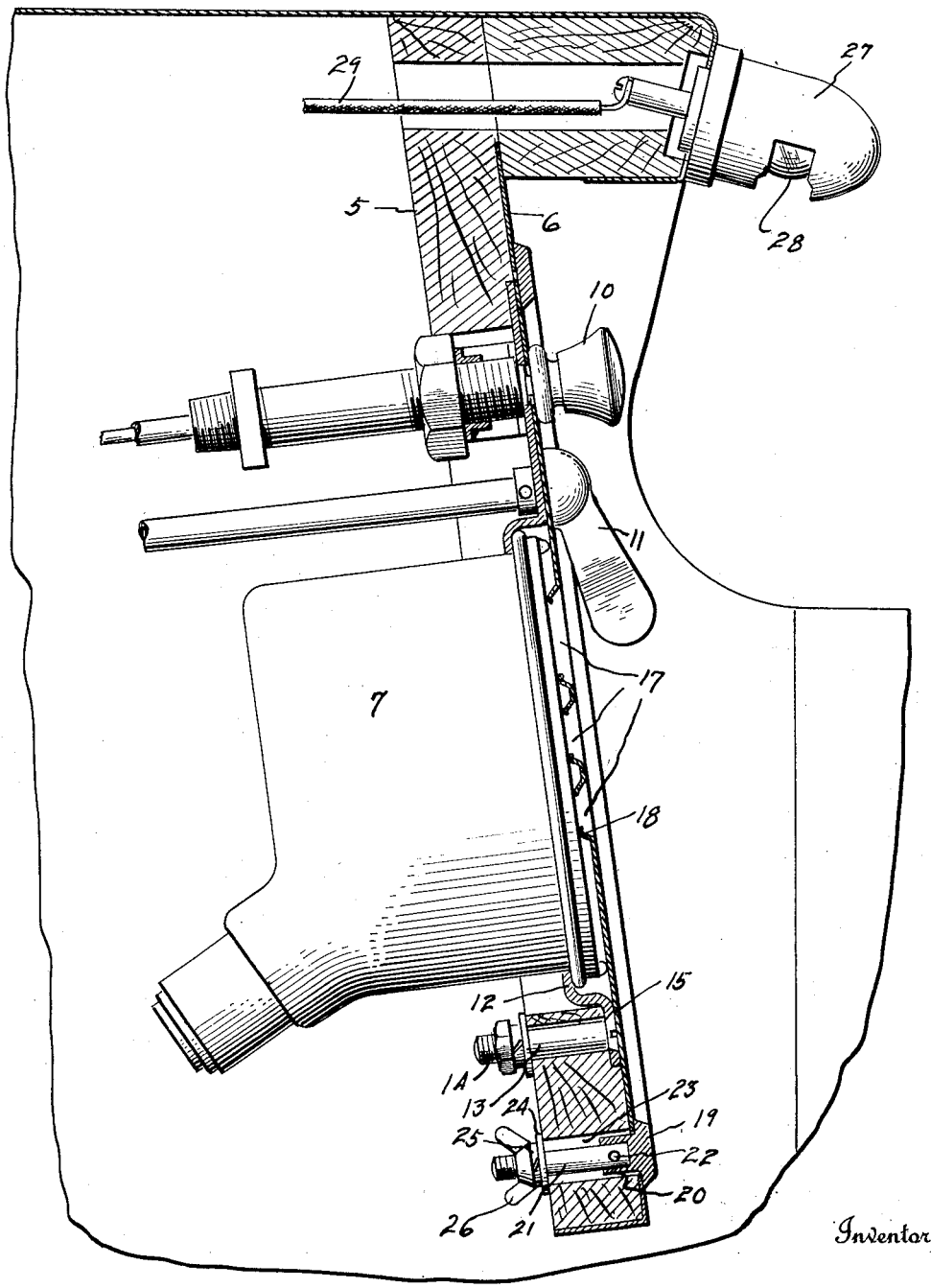
Fig. 3 is a sectional view taken on line 3—3 of Fig. 1.

The plate 15 is provided with a series of openings therein as may be illustrated in Fig. 3 at 17 through which the dials of the speedometer as well as of the oil gage and ammeter may be seen and openings through which the connections to the choke and to the ignition and light switch handles may be made. The plate at the edges of the openings to the speedometer, oil gauge and ammeter is bent downwardly so as to provide a smooth appearance, the lowermost edges thereof being bent so as to rest flat against the faces of the instruments as is illustrated at 18 in order to prevent vibration of the central portion of the plate.

I provide a beading 19 adapted to cover the interval between the plate 15 and the metal instrument board covering 6. The beading 19 has integrally formed studs 20 at intervals thereon which studs are centrally apertured so as to receive bolts 21 therein. The bolts 21 may be secured in any suitable manner therein such as by pins 22 or by being screwed therein. Apertures 23 are provided in the instrument board 5 at suitable intervals through which the bolts 21 are adapted to pass. I then provide a pair of washers 24 and 25 adapted to fit over the bolts 21 and rest against the back of the instrument board 5. Wing nuts 26 are then screwed on the ends of the bolts 21 and against the washer 25 thus securing the beading 19 rigidly in place over the plate 15 and the covering 6. In this manner, the face of the instrument board plate 6, the plate 15 and the beading 19 are left absolutely free of any unsightly securing means.

A dash light 27 having a conventional electric bulb 28 therein and connected through the wire 29 to a suitable source of current may be disposed directly over the plate 15 and secured to the instrument board by the screws 30 so as to effectively illuminate all the instruments. It will thus be seen that I have provided a simple and economical means for centralizing all of the instruments usually found on the dash of an automobile in such a manner as to lend the greatest amount of beauty thereto. It should be understood that the configuration of the plate 15 and the etching thereon may be altered in any manner desired and that various other changes may be made in the arrangement, combination and construction of the various parts of my improved device without departing from the spirit of my invention, it being my intention to cover by my claims such changes as may be reasonably included within the scope thereof.

What I claim is:

1. In combination, an instrument board having a covering thereon, instruments centrally grouped on said board and a plate disposed over certain of said instruments and having apertures therein through which certain of said instruments may pass and other apertures therein through which portions of said instruments disposed beneath said plate may be seen, the edges of said plate at the latter apertures being bent downwardly and horizontally.

2. In combination, an instrument board having centrally grouped instruments thereon and an etched plate disposed on said board and around said instruments and adapted to cover portions of said instruments, and a beading disposed around the outer edges of said plate, lugs depending from said beading and adapted to extend through said instrument board and means attachable to said lugs at their outer ends whereby said beading may be held against displacement.

3. In combination, an instrument board having a series of instruments mounted thereon, a covering for said board having a single aperture therein surrounding said instruments, a plate adapted to fit within said aperture and cover certain of said instruments, apertures in said plate through which the dials of the latter instruments may be seen and other apertures therein through which portions of other instruments may project.

4. In combination, an instrument board having a series of instruments mounted thereon, a covering for said board having a single aperture therein surrounding said instruments, a plate adapted to fit within said aperture and cover certain of said instruments, apertures in said plate through which the dials of the latter instruments may be seen and other apertures therein through which portions of other instruments may project, and a beading disposed around the outer edges of said plate and adapted to cover the interval between said plate and said covering.

5. In combination, an instrument board having a series of instruments mounted thereon, a covering for said board having a single aperture therein surrounding said instruments, a plate adapted to fit within said aperture and cover certain of said instruments, apertures in said plate through which the dials of the latter instruments may be seen and other apertures therein through which portions of other instruments may project, and a beading disposed around the outer edges of said plate, lugs depending from said beading and adapted to extend through said instrument board and means attachable to said lugs at their outer ends whereby said beading may be held against displacement.

6. In combination an instrument board having a series of instruments mounted thereon, a covering for said board having a single aperture therein surrounding said instruments, a plate adapted to fit within said aperture and cover certain of said instruments, and apertures in said plate through which the dials of the latter instruments may be seen.

LOWELL C. FREEMAN.